(12) United States Patent
Arns

(10) Patent No.: US 6,278,534 B1
(45) Date of Patent: *Aug. 21, 2001

(54) DISPERSIVE OPTICAL DEVICE

(75) Inventor: James A. Arns, Saline, MI (US)

(73) Assignee: Kaiser Optical Systems, Ann Arbor, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,154

(22) Filed: Nov. 26, 1997

Related U.S. Application Data

(60) Provisional application No. 60/031,925, filed on Nov. 27, 1996.

(51) Int. Cl.[7] .......................... G02B 5/32; G02B 27/44; G03H 1/00; G01J 3/18
(52) U.S. Cl. ...................... 359/15; 359/34; 359/566; 356/334
(58) Field of Search .............................. 359/15, 34, 9, 359/124, 130, 566; 356/334, 333, 328

(56) References Cited

U.S. PATENT DOCUMENTS

| | | | |
|---|---|---|---|
| 4,591,270 | * | 5/1986 | Ahlen .................................. 356/333 |
| 4,671,603 | * | 6/1987 | McQuoid et al. ....................... 359/15 |
| 4,752,130 | * | 6/1988 | George et al. ........................ 356/334 |
| 5,268,985 | * | 12/1993 | Ando et al. .............................. 359/34 |

OTHER PUBLICATIONS

Y. Huang, D. Su, Y. Tsai, "Wavelength–division–multiplexing and –demultiplexing by using a substrate–mode grating pair," *Optics Letters*, vol. 17, No. 22, Nov. 15, 1992, pp. 1629–1631.

D. Sheat, G. Chamberlin, D. McCartney, "Double dispersion from dichromated gelatin volume transmission gratings," *Practical Holography V*, SPIE vol. 1461, 1991, p. 35–38.

R. Kostuk, Y. Huang, D. Hetherington, M. Kato, "Reducing alignment and chromatic sensitivity of holographic optical interconnects with substrate–mode holograms," *Applied Optics*, vol. 28, No. 22, Nov. 15, 1989, p. 4939–44.

E. Treacy, "Optical Pulse Compression with Diffraction Gratings," *IEEE Journal of Quantum Electronics*, vol. QE–5, No. 9, Sep. 1969, pp. 454–458.

* cited by examiner

*Primary Examiner*—Audrey Chang
(74) *Attorney, Agent, or Firm*—Gifford, Krass, Groh, Sprinkle, Anderson & Citkowski, PC

(57) ABSTRACT

A compact, preferably monolithic optical element converts an incident beam of light into a dispersed exit beam. A transmissive optical grating is supported between two reflective surfaces such that a beam is reflected to pass through the same grating at least twice to form the exit beam. In the preferred embodiment the grating is a volume hologram cemented between two optically transmissive substrates which include outwardly oriented surfaces that are parallel to one another and to the grating, and the internal reflections occur at these surfaces. Mirrors may also be used. A preferred method of grating formation is also disclosed.

21 Claims, 2 Drawing Sheets

DISPERSIVE OPTICAL DEVICE

REFERENCE TO RELATED APPLICATION

This application claims priority of U.S. provisional application Ser. No. 60/031,925, filed Nov. 27, 1996, the entire contents of which are incorporated herein by reference.

FIELD OF THE INVENTION

The present invention relates generally to optical dispersion and, in particular, to a device, preferably monolithic in construction, which utilizes a transmissive grating and internal reflection to convert an input beam into a dispersive output beam.

BACKGROUND OF THE INVENTION

Optical dispersion, that is, the separation of light into its constituent wavelength components, is a phenomenon used by a wide variety of applications, including Raman and fluorescence detection and other forms of spectral analysis. In addition, the emerging field of optical communications uses optical dispersion to perform wavelength multiplexing and demultiplexing, filtering and other functions. Although the concept of optical dispersion has been known for quite some time, the earliest apparatus utilized prisms as a diffraction means. Optical gratings were later developed for this purpose, and, since the invention of holography, holographic gratings have been applied to this task with enhanced efficacy.

It is known to pass polychromatic light through a pair of identical gratings that act together to provide an output beam which is both collimated and laterally dispersed. Such an arrangement is disclosed by E. B. Treacy in "Optical Pulse Compression With Diffraction Gratings," *IEEE Journal of Quantum Electronics*, Vol. QE-5, No. 9, Sep., 1969, which finds particular application in pulse compression for ultrafast laser systems that employ chirped-pulse amplification. The first grating diffracts each wavelength through a different angle according to the grating equation, thereby introducing angular dispersion to the polychromatic beam, so that the beam spreads as it propagates from the first grating toward the second. The second grating diffracts each wavelength again through the same angle, but in the opposite direction, so that the beam leaves the second grating in the same direction as the beam that was incident to the first grating, with the various wavelengths being spread laterally but propagating in exactly the same direction, or recollimated. One disadvantage of this configuration is that the gratings and auxiliary optics are separate elements that must be individually mounted and aligned, with the attendant risk of alignment drift with time or mechanical motions such as vibration.

It is also known that dispersion may be increased by passing light through a plurality of gratings, each grating further dispersing the light incident to it. In "Double dispersion from dichromated gelatin volume transmission gratings," *Proceedings of the SPIE*, vol 1461, 1991, D. E. Sheat, G. R. Chamberlin, and D. J. McCartney disclosed a configuration wherein light is passed through a single grating two times with the aid of a mirror, either separate from the grating or made part of the grating to form an integrated device. However, this configuration is limited to two passes of the light through the grating, and the beam that exits from the integrated device is counter-propagating with respect to the incident beam, so that separating the input and output beams requires additional optical components or performance compromises. Moreover, the configuration described by Sheat, et. al. only produces angularly dispersed light, so that conversion to a laterally dispersed, collimated beam again requires additional optical components.

There are also described in the literature dispersive optical elements specifically intended for optical communications. Such a structure is described by Y. Huang, D. Su, and Y Tsai in "Wavelength-division-multiplexing and—demultiplexing by using a substrate-mode grating pair," *Optics Letters*, Vol. 17, No. 22, Nov. 15 1992. According to this device, within a substrate-mode element there are two distinct gratings which first angularly disperse and then recollimate incident light. The output channel separation or the spatial dispersion of such a structure is directly related to the angular dispersion obtained through the first grating and the distance the dispersed light travels before being collimated by the second grating. The amount of dispersion in the substrate-mode element is therefore dependent on the length as well as the thickness of the substrate.

In a practical sense, the substrate must therefore be long to provide substantial optical distance between the dispersing grating and the collimating grating to obtain high degree of spatial dispersion. Additionally, the space between the dispersing and collimating grating cannot include a grating, or the total internal reflection necessary for propagation would be prevented.

Another prior-art device is described by R. Kostuk, et. al. in "Reducing alignment and chromatic sensitivity of holographic optical interconnects with substrate-mode holograms," *Applied Optics*, Vol. 28, No. 22, Nov. 15, 1989. The structure of the substrate-mode element described in this paper incorporates a holographic grating as an input element to produce a +1 and a +1 diffracted order from the incident light. These orders propagate through the substrate by means of multiple internal reflections until intercepted by holographic optical elements which redirect, focus, and couple each beam out of the structure and onto receivers. The purpose of this structure is to produce multiple beams output into some preferred spatial arrangement from a single incident beam of coherent light.

There continues to exist, therefore, an outstanding need for an optically dispersive structure which may take advantage of the same grating to achieve a multiplicative dispersive effect, ideally, to achieve a high degree of direct lateral dispersion from a monolithic component.

SUMMARY OF THE INVENTION

This invention resides in a compact optical arrangement for converting an incident beam of light into a dispersed exit beam. In a preferred embodiment, the device takes the form of a single, monolithic construct, thereby eliminating the need for separate, discrete optical elements which might be sensitive to vibration or require frequent realignment. The input and output beams propagate along independent paths, and the device may be tailored to produce a laterally dispersed exit beam directly, thus eliminating the need for additional components to separate out or recollimate the output beam.

According to a preferred apparatus, a transmissive optical grating is supported between two reflective surfaces such that the beam passes through the same grating at least twice (or a plurality of gratings in the same plane) to form the exit beam. Additional angular dispersion is achieved on each odd number of grating passes, whereas, on each even pass, the angularly dispersed beam into a laterally dispersed, collimated beam, which may be output directly. As such, a significantly higher amount of dispersion can be easily obtained and controlled within a compact, robust element as compared to prior-art configurations.

In the preferred embodiment the optical grating is a volume hologram cemented between substrates in the form of glass blocks or prisms. Both of the substrates include outwardly disposed surfaces which are preferably parallel to one another and to the plane of the grating, and internal reflections occur at these surfaces. Inclined beam entrance and exit surfaces are provided as a preferred option, such that the incident beam enters one of the substrates at an angle which is substantially normal to the entrance surface, and the dispersed beam exits the device at an angle which is substantially normal to the exit surface. Mirrors may be used to enhance or replace internal reflection.

A method of dispersing a light beam according to the invention includes the steps of supporting a transmissive, dispersive optical grating between two optically transmissive substrates, each such substrate including an outwardly oriented surface spaced apart from the grating. The light beam to be dispersed is introduced into one of the two substrates, such that it passes through the grating at least two times due to one or more reflections internal to the substrates prior to exiting.

The dispersed exit beam may be applied to a wide range of utilization devices, such as detectors, inputs to optical fibers or other optical components, filters, monochromators, and so forth. In an optical communications system, a wavelength-multiplexed incident beam may be dispersed and delivered to independent optical fibers, or the outputs from different fibers may be fed through an inventive device to perform a wavelength-multiplexing function. Alternatively, through the use of an appropriate spatial filter, the device may be used to perform a bandpass function to clean up a coherent source.

DETAILED DESCRIPTION OF THE INVENTION

Figure 1:
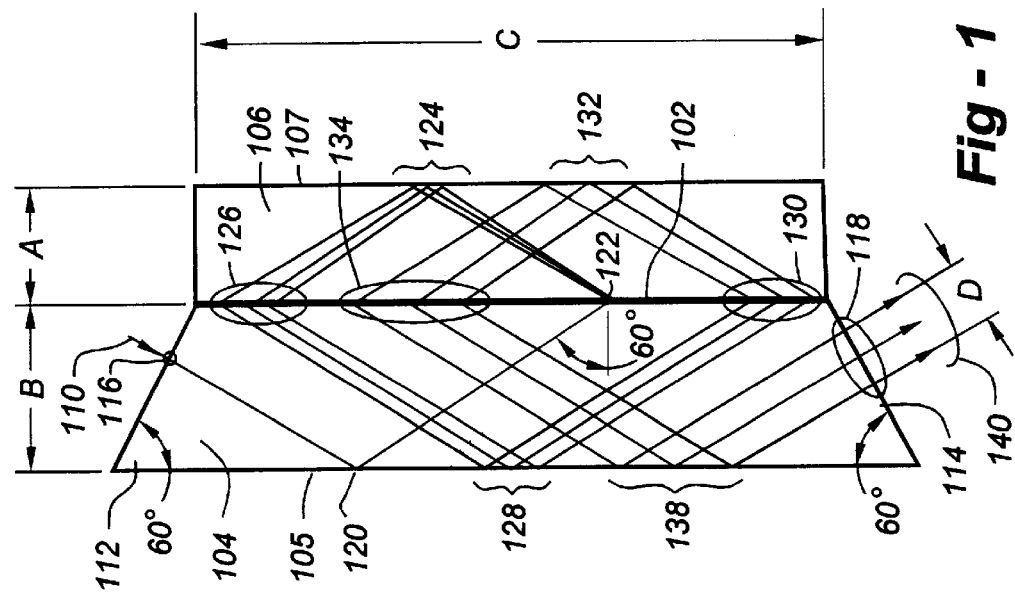
FIG. 1 is a drawing in cross-section of a monolithic, high-dispersion optical element formed according to the invention.

FIG. 1 is a drawing which illustrates, in cross-section, a monolithic, high-dispersion optical element according to the invention. Broadly, the device consists of a transmissive grating 102 sandwiched between two pieces of bulk material 104 and 106 which are optically transparent at least to wavelengths of interest. Although the grating 102 is preferably a single element, multiple gratings disposed in the same plane may be used so long as they are positioned to perform the dispersion and collimation functions as described herein.

Figure 7:
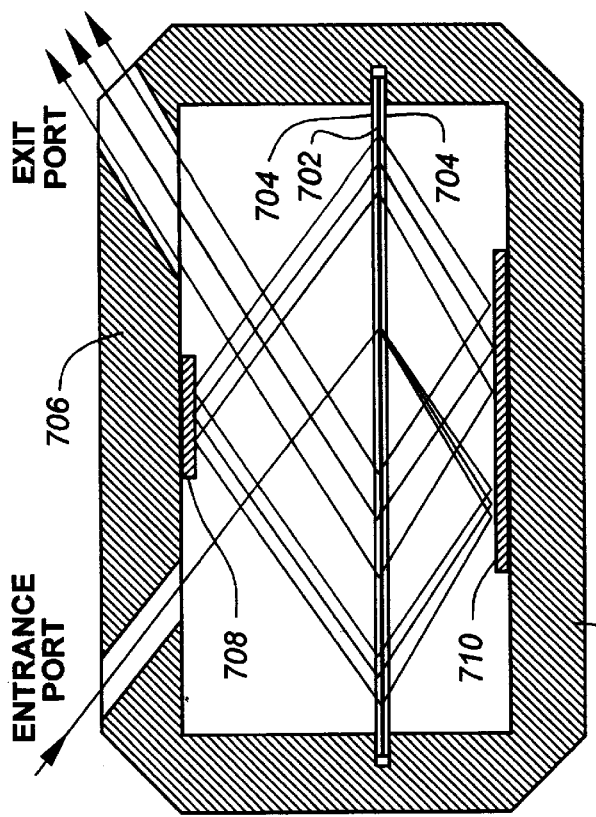
FIG. 7 represents an alternative embodiment of the invention which utilizes mirrors as opposed bulk materials and internal reflection.

In addition, although the term "substrates" will be used in referring to the pieces of bulk material 104 and 106, other terms such as "plates," "blocks" or "prisms" may be equally applicable according to the entrance/exit beam configuration, in particular. Indeed, in the event that mirrors are used exclusively in place of internal reflection, as discussed in further detail below, one or both of the substrates 104 and 106 may be replaced with air or another gas, as shown in FIG. 7. Such a configuration may be desirable in the event that bulk materials attenuate or otherwise degrade optical signals of interest. In this case, the grating 702 is sandwiched between two thin substrates 704 for the sake of protection, and an outer shell 706 is used to orient the grating assembly between mirrors 708 and 710.

The grating 102 may be formed in a holographic recording material such as dichromated gelatin (DCG), which is well known, though other materials or material combinations may be utilized, as available, depending upon the desired geometry, wavelengths of interest, and so forth. A fabrication process is discussed with reference to FIG. 6.

Figure 2:
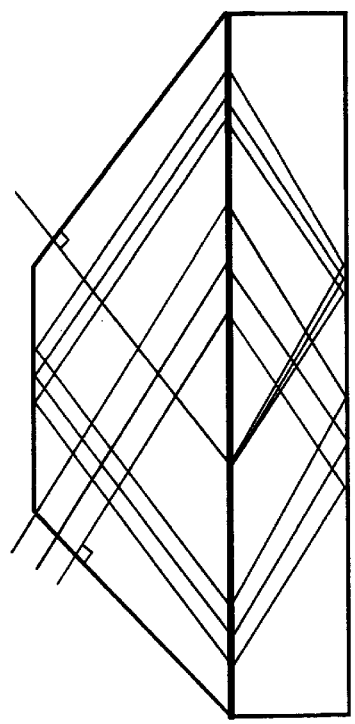
FIG. 2 is a drawing of an alternative embodiment of the invention showing a different entrance and/or exit surface.

In a preferred arrangement, the substrate 104 includes angled ends 112 and 114 to ensure that the input beam 110 enters, and output energy 140 exits, from the device at an angle which is normal to the surface of substrate 104 at points 116 and 118, respectively, thereby minimizing surface reflections while providing ease of alignment. An alternative configuration is illustrated in FIG. 2, with the understanding that other arrangements are possible. The entrance and/or exit surfaces may also feature anti-reflective coatings to further minimize surface reflections.

Having entered the substrate 104, the beam 110 undergoes a first total internal reflection at point 120, causing it to become redirected toward the grating 102. The outer surfaces 105 and 107 of the block 104 and 106, respectively, may rely entirely upon total internal reflection, or reflective coatings may be applied, or some combination of these techniques may be utilized to enhance or control the reflective effect.

Having been first reflected, the incident beam strikes the grating 102 at a point 122, and is angularly dispersed according to the frequency of the grating lines in grating 102. Preferably, the fringes are arranged such that the dispersed rays are diffracted at substantially the same angle as the incident beam relative to a normal to the plane of the grating, such as 60 degrees or some other convenient angle, thereby facilitating an internal reflection of the dispersed beam at points 124. In the area of 126, the dispersed rays pass back through the same grating 102 in a counter-propagating manner, thereby exiting the grating laterally dispersed but recollimated, owing to the use of the same grating in two different directions.

The collimated rays once again experience a total internal reflection in the vicinity of 128, and strike the grating once again in the vicinity of 130, resulting in a second angular dispersion of the laterally dispersed beam. Upon a total internal reflection at area 132, a second recollimation takes places at area 134, and following an additional total internal reflection at 138, the dispersed beam exits as rays 140, preferably in collimated form.

Note that the dimension labeled A, in conjunction with grating frequency, dictates the amount of spatial spread D of the angularly dispersed beams, and that dimensions B and C are, in this case, chosen to ensure four passes through the grating, while allowing the incident and exit beams to pass through the device without traversing the grating before and after a first and final total internal reflection, respectively.

Figure 3:
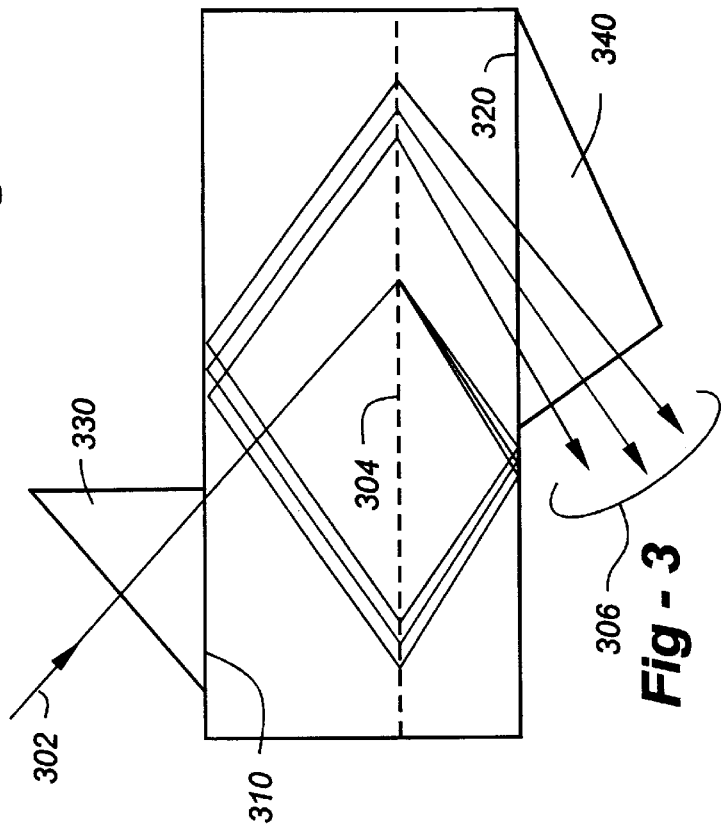
FIG. 3 illustrates an embodiment of the invention which outputs an angularly dispersed beam.

It should also be noted that these configurations may be varied widely according to the invention to permit angularly dispersed (as opposed to collimated) exit beams, and more or fewer passes through the grating so as to alter the level of dispersion. In FIG. 3, for example, an incident beam 302 passes through a grating 304 three times to output an exit beam 306 which is angularly dispersed. Solid lines 310 and 320 show that, instead of forming irregularly shaped substrates in solid form, additional pieces such as prisms 330 and 340 may be cemented onto rectangular slabs to provide desirable entrance and exit surfaces.

Figure 5:
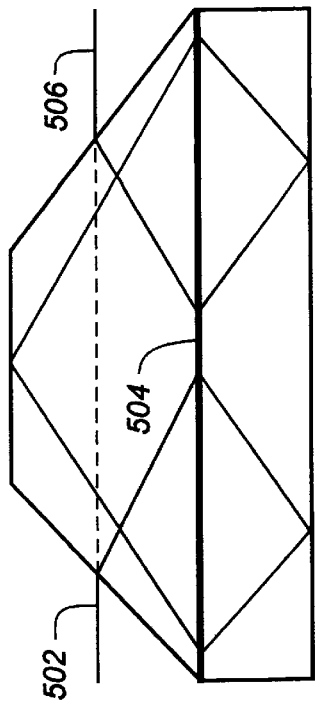
FIG. 5 is an alternative embodiment of the invention having in-line incident and exit beams.
Figure 4:
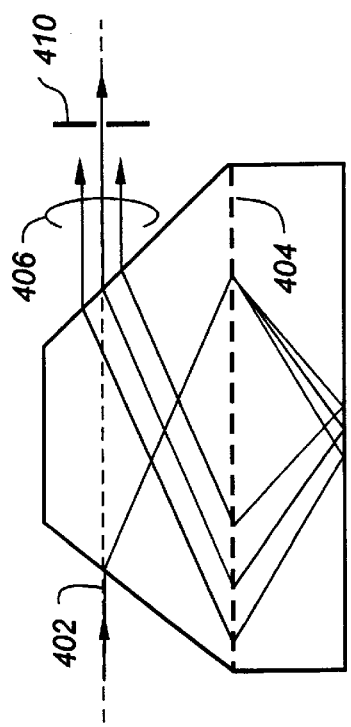
FIG. 4 shows how a device according to the invention may be used as an in-line laser bandpass filter.

As shown in FIG. 4, an incident beam 402 may pass through the same grating 404 only two times, thereby facilitating a lesser degree of dispersion but permitting a collimated output 506 from a monolithic device. A spatial filter 410 may be supported relative to the exit beam to provide a laser bandpass function, for example. FIG. 5 illustrates an alternative configuration wherein an incident beam 502 passes through a grating 504 four times to yield an in-line, laterally dispersed output 506 with a greater degree of dispersion.

A transmissive grating for use by the invention may be formed by exposing a photosensitive material, preferably dichromated gelatin, to the interference pattern formed between two beams of coherent light, and developing the photosensitive material to form a holographic grating. The grating frequency is preferably sufficiently high so that the incident and diffracted beams are at angles that exceed the critical angle within the substrate. Consequently, a technique must be provided to couple the construction beams used to form the grating into the grating substrate during the holographic exposure.

Figure 6:
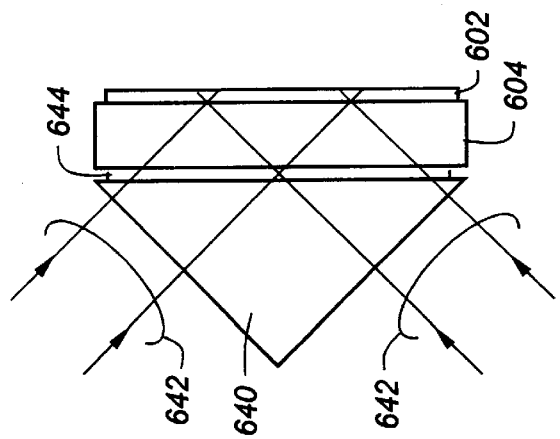
FIG. 6 is used to describe an inventive method of device fabrication.

As illustrated in FIG. 6, this can be accomplished through the use of a prism 640 that is in optical contact with the substrate 604. Optical contact can be achieved, for example, by using an index matching fluid to fill the space 644 between the prism and the substrate. The free surfaces of the prism are at angles such that the incident wavefronts 642 can pass therethrough at low angles of incidence relative to those surfaces, but achieve the required high angles of incidence relative to the photosensitive material 602 on the substrate. After exposure, the substrate is separated from the prism and the index matching fluid is removed with a solvent prior to developing the hologram.

In the configuration illustrated in FIG. 6, the exposing wavefronts, after passing through the photosensitive material 602, will be internally reflected at the interface between the photosensitive material and air. The internal reflections of the exposing wavefronts will create additional fringe patterns in the photosensitive material that are undesirable in the grating. This problem can be prevented by coupling a plate to the photosensitive material that absorbs the light of the transmitted wavefronts. Again, coupling may be achieved with the aid of an index matching fluid between the photosensitive material and the absorbing plate. The absorbing plate can be made of glass incorporating dyes that absorb light with the wavelength of the exposing wavefronts.

That claimed is:

1. An optical device defining a device volume which converts an incident beam of light into a highly dispersed exit beam, comprising:
   a transmissive, dispersive optical grating supported in a plane between a plurality of reflective surfaces, the optical behavior of the grating and spacing of the surfaces being such that upon entry of the incident beam into the device volume, the beam is reflected by at least one of the surfaces so as to pass through the grating at least twice to form the highly dispersed exit beam.

2. The optical element of claim 1, wherein the transmissive optical grating is a volume hologram.

3. The optical element of claim 1, wherein the grating is cemented between two pieces of transmissive bulk material, and wherein the reflections occur at the surfaces are surfaces of the bulk material.

4. The optical element of claim 1, wherein the surfaces are provided by mirrors spaced apart from the grating.

5. The optical element of claim 1, wherein the surfaces which are parallel to each another and to the plane of the grating.

6. The optical element of claim 1, wherein the grating is characterized as having a forward direction through which the beam is angularly dispersed and a reverse direction through which the beam is recollimated, and wherein the beam passes through the grating at least twice in the forward direction.

7. The optical element of claim 1, wherein the grating is characterized as having a forward direction through which the beam is angularly dispersed and a reverse direction through which the beam is recollimated, and wherein the beam passes through the grating at least once in both directions.

8. The optical element of claim 7, wherein the exit beam is substantially collimated.

9. The optical element of claim 1, wherein the exit beam is substantially collimated.

10. An optical device which converts an incident beam into a highly dispersed exit beam, comprising:
    first and second blocks of optically transmissive material, each block having an inner and an outer surface; and
    a transmissive, dispersive optical grating disposed in a plane between the inner surfaces of the two blocks of material, such that a beam of light entering into one of the blocks passes through the grating at least twice through internal reflection.

11. The device of claim 10, wherein the grating is a volume hologram.

12. The device of claim 10, wherein the outer surfaces are parallel to one another and to the plane of the grating.

13. The device of claim 10, wherein the incident beam enters one of the blocks at an angle which is substantially normal to a surface of that block.

14. The device of claim 10, wherein the exit beam leaves one of the blocks at an angle which is substantially normal to the a surface of that block.

15. The optical element of claim 10, wherein the incident beam is angularly dispersed by the grating at least twice.

16. The optical element of claim 10, wherein the exit beam is substantially collimated.

17. A method of dispersing a light beam, comprising the steps of:

supporting a transmissive, dispersive optical grating between two reflective surfaces; and using the surfaces to pass the light beam through the grating at least two times to form a highly dispersive exit beam.

18. The method of claim 17, wherein the transmissive optical grating is a volume hologram.

19. The method of claim 17, wherein the grating is cemented between two pieces of transmissive bulk material, and wherein the reflections occur at the surfaces of the bulk material.

20. The method of claim 17, wherein the surfaces are provided by mirrors spaced apart from the grating.

21. The method of claim 17, wherein the grating is characterized as having a forward direction through which the beam is angularly dispersed and a reverse direction through which the beam is recollimated, and wherein the beam passes through the grating at least twice in the forward direction.

* * * * *